E. S. JONES.
DIRIGIBLE, AUTOMATICALLY OPERABLE HEADLIGHT FOR AUTOMOBILES.
APPLICATION FILED DEC. 16, 1921.
1,428,235. Patented Sept. 5, 1922.
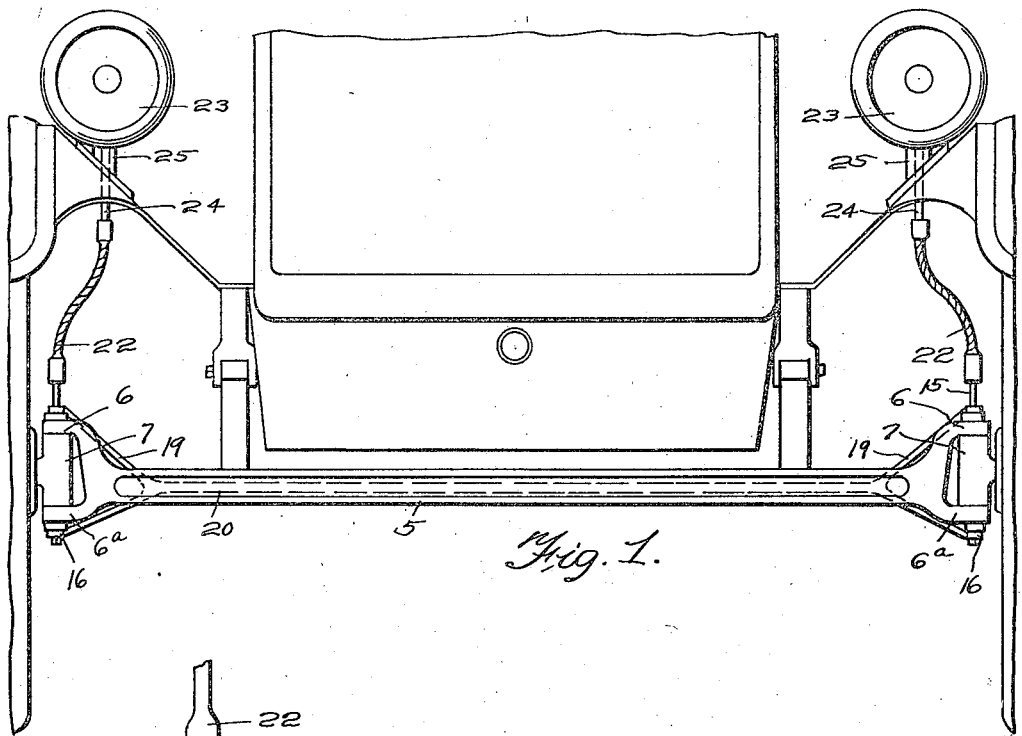
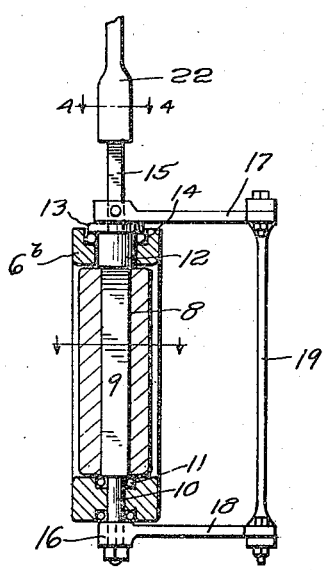
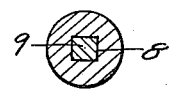
Inventor
Edward S. Jones
By Shepherd & Campbell
Attorneys Patented Sept. 5, 1922.

1,428,235

UNITED STATES PATENT OFFICE.

EDWARD S. JONES, OF MOBILE, ALABAMA, ASSIGNOR OF ONE-HALF TO JOHN M. SIMPSON, OF MOBILE, ALABAMA.

DIRIGIBLE, AUTOMATICALLY-OPERABLE HEADLIGHT FOR AUTOMOBILES.

Application filed December 16, 1921. Serial No. 522,876.

*To all whom it may concern:*

Be it known that I, EDWARD S. JONES, a citizen of the United States, residing at Mobile, in the county of Mobile and State of Alabama, have invented certain new and useful Improvements in Dirigible, Automatically-Operable Headlights for Automobiles, of which the following is a specification, reference being had therein to the accompanying drawings.

This invention relates to a headlight mounting for automobiles and it has for its object to provide a simple and inexpensive mechanism whereby the headlight may be operated in unison with steering mechanism so that the light rays may be directed in the direction in which the machine is about to turn when rounding curves so that the driver will be able to see objects around the curve which would otherwise be invisible to him.

It is a further object of the invention to construct the mechanism by which the lights are actuated in such manner as to provide a safe-guard against accidental breakage of the steering gear.

Further objects and advantages of the invention will be set forth in the detailed description which follows.

In the accompanying drawing:

Fig. 1 is a view of the front end of an automobile having the invention applied thereto;

Fig. 2 is an enlarged vertical section through one of the spindle knuckles with the spindle bolt in elevation;

Fig. 3 is a horizontal sectional view upon line 3—3 of Fig. 2; and

Fig. 4 is a horizontal sectional view upon line 4—4 of Fig. 2.

Like numerals designate corresponding parts in all of the figures of the drawing.

Referring to the drawing 5 designates the front axle of an automobile the opposite ends of which are forked, as indicated at 6, for the reception of the steering knuckle. Ordinarily these steering knuckles are mounted upon round bolts and turn on said bolts but according to my improved construction I make the openings through these knuckles angular in cross-section, as indicated at 8, and I provide a spindle bolt having a correspondingly angularly formed portion 9 adapted to engage in said portion 8 so that the bolts and knuckles are caused to turn together. A rounded portion 10 upon the bolt passes through the lower arm 6ª of the yoke and may, if desired, have ball-bearing mounted therein, as indicated at 11. A rounded portion 12 of larger diameter than the portion 9 passes through the upper arm 6ᵇ of the yoke and carries a collar 13. If desired antifriction mountings 14 may be provided for the upper portion of the bolt within the arm 6ᵇ. Angular portions 15 and 16 formed upon the upper and lower ends of the bolts engage with crank arms 17 and 18 and the extremities of these arms are pivotally connected with the forked ends 19 of the usual steering drag link 20. Thus it will be observed that lateral movement of the drag link or movement transversely of the machine as whole will impart a turning movement to the bolt and consequently will impart the necessary turning movement to knuckle 7 of each wheel. At the present time it is the practice to make these drag links connect with the crank arms integral with and projecting rearwardly from the knuckles 7. However, if these integral arms break it means that a serious accident follows, because the driver then has no control over the front wheel with which said arm is connected. By the provision of the structure herein shown and described, this contingency is guarded against by providing two crank arms 17 and 18, either of which will serve to transmit motion to and control the steering knuckle. Therefore, if one of these arms breaks the other will function and thus prevent wreckage of the machine. The angular upper end of each bolt 15 which turns with its knuckle 7 has slidable engagement in a correspondingly shaped angular opening 21 of a sleeve 22. The headlights 23 are carried by spindles 24 that are mounted to turn in bearings 25. Where the lamps can be directly alined with the spindle bolts the sleeves 22 may constitute an extension of the spindles 24, but where, by reason of the construction of the automobile these lamps cannot be directly alined with the spindle bolts, suitable flexible connections between the upper ends of the spindle bolts and these spindles 24 may be employed. In the present instance, I have chosen to indicate a section of flexible shafting such as is used upon speedometers but it is manifest that rigid elements with universal joints interposed therein may be employed in lieu of the flexible shaft connections, without the exercise of more than mere mechanical skill.

It is to be understood that the invention is not limited to the precise construction set forth but that it includes within its purview whatever changes fairly come within either the terms or the spirit of the appended claims.

Having described my invention what I claim is:

1. In combination with a steering knuckle of an automobile having an angular opening formed therethrough, of an axle having a forked end within which the said knuckle is received, a spindle bolt adapted to traverse the arms of said yoke and said knuckle, said spindle bolt having an angular portion engaging a correspondingly shaped opening in the knuckle and round portions engaged in the said arms of the yoke, crank arms upon the said bolt above and below the said yoke, a drag link having a forked end engaging with the said crank arms there being an angular portion upon the bolt above the uppermost of said crank arms, a sleeve having slidable engagement with said angular upper end of the bolt, a headlight mounted for turning movement and a connection between said sleeve and said headlight.

2. In combination with an automobile an axle having a forked end, a steering knuckle received in said forked end and having an angular opening formed therethrough, a bolt comprising a rounded upper portion, an angular intermediate portion, a rounded lower portion and an angular lower extremity, ball-bearings engaging the rounded portions of the said bolts within the arms of the yokes, a crank arm upon the angular lower portion of the bolt, a crank arm upon an angular upper portion of the bolt, a drag link having connection with both of said crank arms, a tubular sleeve having slidable engagement with the said angular upper portion of the bolt, a movable headlight, a spindle carried by said movable headlight and a flexible connection between said sleeve and spindle.

In testimony whereof I hereunto affix my signature.

EDWARD S. JONES.